Figure 4:
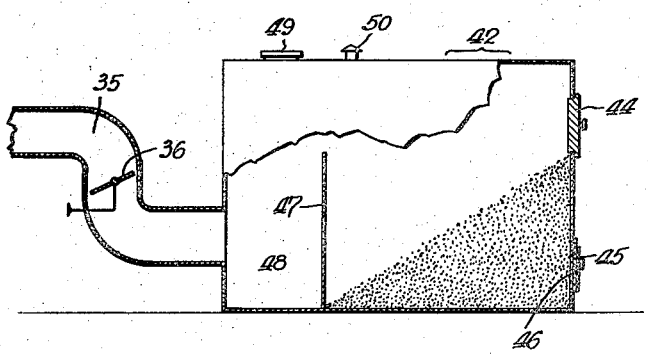

March 2, 1943.  R. L. JONES  2,312,339
SMOKEHOUSE APPARATUS
Filed Dec. 23, 1938  2 Sheets-Sheet 1
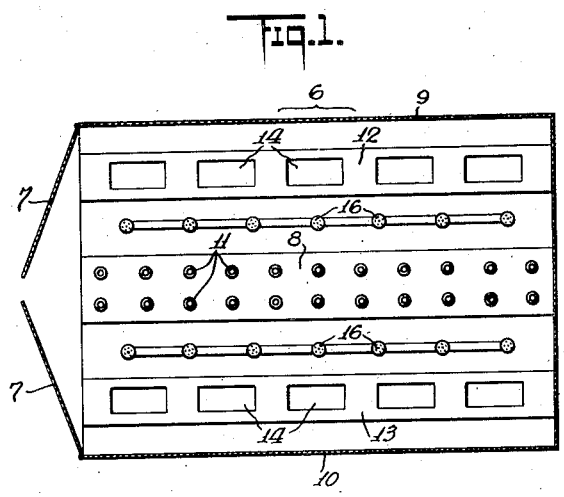
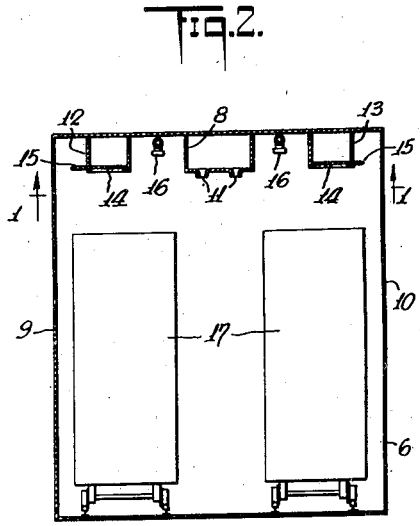
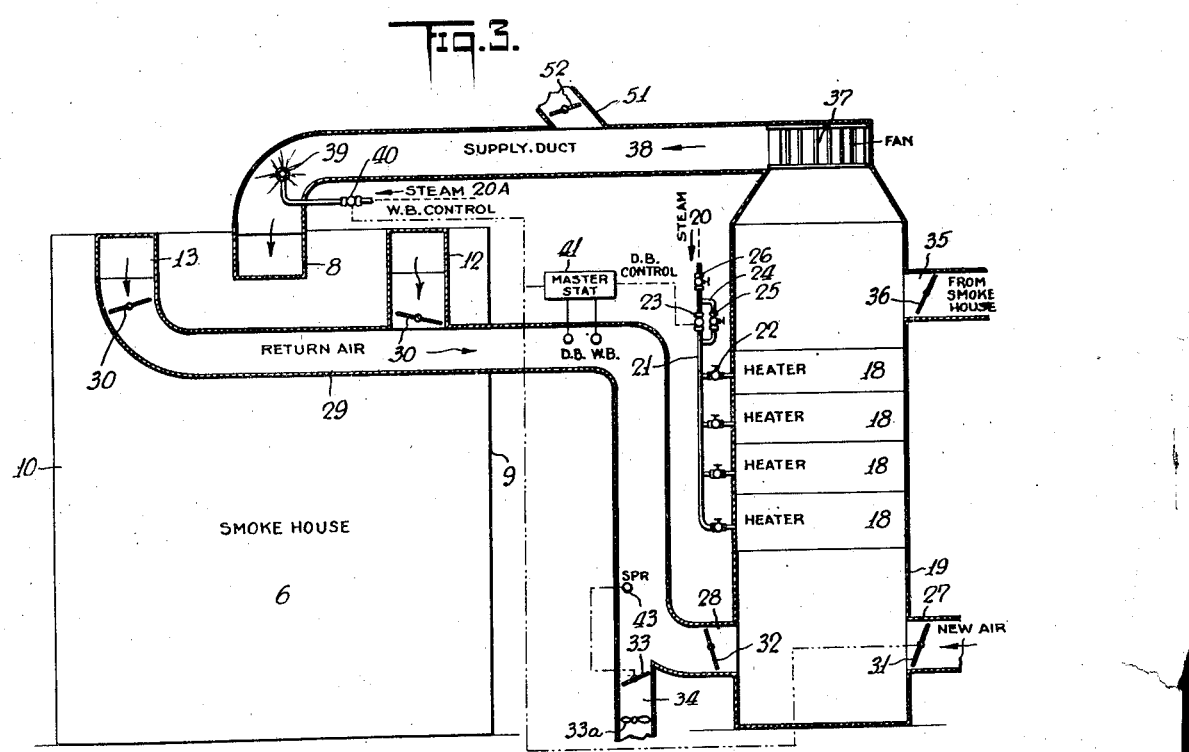
INVENTOR
Robert Leslie Jones
BY
ATTORNEY March 2, 1943.  R. L. JONES  2,312,339
SMOKEHOUSE APPARATUS
Filed Dec. 23, 1938   2 Sheets-Sheet 2

INVENTOR
*Robert Leslie Jones*
BY
ATTORNEY

Patented Mar. 2, 1943

2,312,339

UNITED STATES PATENT OFFICE 2,312,339

SMOKEHOUSE APPARATUS

Robert Leslie Jones, Evanston, Ill., assignor to Carrier Corporation, Syracuse, N. Y., a corporation of Delaware Application December 23, 1938, Serial No. 247,415

6 Claims. (Cl. 99—259)

This invention relates to the processing of food products, such as sausages and hams, in which a series of operations are employed, including the application of heat and smoke, for the purpose of imparting desired characteristics to the finished products.

The principal object of the invention is to afford to meat packers and processors an apparatus for treating and processing products, requiring the application of smoke, in a single enclosure, in which all of the steps for the production of the finished product may be carried on without interruption between the curing step and storage prior to packing for shipment.

A feature of the invention, therefore, resides in the provision of an enclosure generally identified herein by the term "smokehouse" in which the meat products are subjected to temperature and humidity changes, and to the application of smoke in prescribed densities, in steps following a predetermined schedule, with the result that a uniform product is produced having required characteristics of color, taste, meat consistency, casing appearance, binder quality between casing and filler, plumpness or firmness, and weight per unit.

While the treatment and smoking of meat products of the sausage variety is an old art, the operations have heretofore been carried on in a plurality of rooms, of which the smokeroom was one, and in a plurality of interrupted steps. As a result, due to the necessary handling operations between processing steps carried out in one enclosure and those carried on in the next, as where smoking takes place in a smokehouse but cooking is done in a separate room, desirable qualities of the produce are impaired and in many cases non-uniform products result since the schedule of operations is not always the same. Similarly, with existing methods a time interval usually elapses between the cooking step subsequent to smoking and the cooling operation which is required prior to storage and packing. Such interruptions in the series of steps carried on between the initial and packing stages often result not only in lack of uniformity, color, plumpness, etc., but have more serious results in impairment of taste, case hardening, shrivelling, and other disadvantages which detract from salability. In such prior methods of operation, the temperatures to which the products are subjected during the necessary series of steps follow a curve having peaks and valleys which, as applicant has found, results in an inferior product as well as added cost, greater space requirements, and longer periods of time for carrying out the necessary processing.

Figure 5:
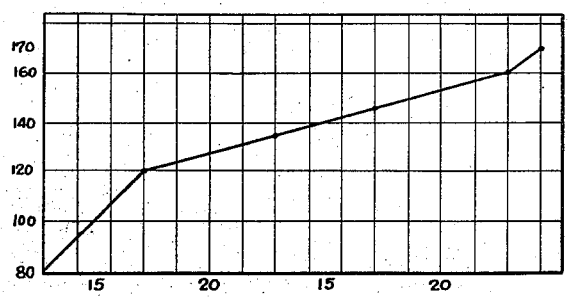

These and other disadvantages of the prior practice are obviated by the present invention, further advantages of which will be apparent from the following description, to be read in connection with the accompanying drawings, in which:

Fig. 1 diagrammatically illustrates, in section along lines 1—1 of Fig. 2, a smokehouse apparatus embodying the invention in a preferred form;

Fig. 2 is a longitudinal view of the smokehouse of Fig. 1, illustrated as containing trucks bearing products to be processed;

Fig. 3 diagrammaticaly illustrates applicant's assembly of apparatus and control arrangement controlling the atmospheric and smoke conditions in the smokehouse;

Fig. 4 illustrates diagrammatically a smokepot arranged to serve applicant's assembly of apparatus; and Fig. 5 illustrates, graphically, a typical time and temperature curve illustrating a preferred method of operating the smokehouse apparatus for processing frankfurt sausage.

Considering the drawings, similar designations referring to similar parts, numeral 6 designates a smokehouse comprising preferably an enclosure consisting of sides, top, and bottom, made of sheet metal or other fireproof material. The enclosure is equipped with doors 7 which are shown at one end thereof but, if desired, doors may be placed at both ends or in the sides. However, with the doors closed, the enclosure may be deemed for practical purposes to be sealed, so that it is leak-proof except for duct and conduit passages employed for admitting or withdrawing air, smoke and liquids thereto and therefrom, utilized for the processing of products therein. In practice, the smokehouse is made in different sizes depending upon the capacity required, and may be made in sections on a production basis and easily assembled at the packing house or other point of use.

Construction or smokehouse

The smokehouse walls, floor and ceiling are preferably insulated. The doors are equipped with seals so that in operation the enclosure is air-tight. A supply duct 8 runs substantially the full length of the smokehouse, at the ceiling level, and spaced centrally with respect to sides 9 and 10. Ejector nozzles 11 positioned in the bottom of supply duct 8 are arranged to discharge air and/or smoke in desired volumes and at a desired velocity downwardly from the ceiling level. Return air ducts 12 and 13 are preferably employed, positioned on each side of the supply duct, also preferably at the ceiling level, running substantially the full length of the smokehouse. Each return duct has a plurality of return air openings 14 in the bottom thereof, each opening equipped with a slide or damper 15. These slides or balancing dampers, are adjusted to assure equal withdrawal of air and smoke from all parts of the smokehouse. A plurality of rows of sprays 16 equipped with nozzles and required water lines serve for supplying water at any desired temperature and/or steam for use in the processing operations.

The dimensions of the smokehouse are such that trucks, cages, or trees 17 may expeditiously be positioned within the smokehouse in desired number, and removed therefrom.

The apparatus

The air conditioning and smoke producing apparatus serving the smokehouse may be assembled in unit form and placed at one end or along one side of the smokehouse, or may be positioned outside of the smokehouse. As illustrated in Fig. 3, a plurality of heater elements 18 positioned within a casing 19 are served with steam from a remote source 20 through conduit 21. Each of the heater elements may be cut out of service by a valve 22 and the supply, when under automatic control, is regulated by valve 23. If the automatic control is not employed, the steam may be routed through bypass 24 under control of valve 25. Cut-off valve 26 admits the steam from the source to the steam piping system. No return piping is shown but this is provided in the usual manner. "New air," which may be air from outdoors or air from an interior area surrounding the smokehouse is admitted through opening 27 which may be a passageway or entrance opening in any desired form. Return air from the smokehouse is admitted to the casing through return air opening 28 which may be in any desired form. The return air is delivered to the opening 28 by a return air passage 29 connecting to return air ducts 12 and 13. The balancing dampers 15 shown in Fig. 2 may be supplemented, or in some cases replaced, by balancing dampers 30 in the return air ducts. In general, dampers 15 will always be provided to assure equal air and smoke movement in all parts of the smokehouse. New air and return air openings 27 and 28 are respectively equipped with dampers 31 and 32 for regulating the admission of air from said sources to the casing. A relief damper 33a serving an exhaust outlet 34 in which is positioned exhaust fan 33 is controlled to maintain substantially atmospheric pressure or a slight negative pressure within the smokehouse. In the alternative exhaust outlet 34, with damper 33 and fan 33a may be replaced by a bleeder passage 51 through which a measured amount of air supplied by fan 37 will be discharged outside of the smokehouse. In this case damper 52 would replace 33, said dampers being controlled either manually or under control of static pressure regulator 43. Inlet 35 admits smoke from the smoke-pot under control of damper 36 to the casing, preferably beyond the heaters. Fan 37 delivers the heated air and/or smoke through supply duct 38 to smokehouse supply duct 8. Within supply duct 38 (or within casing 19) is positioned steam spray 39 to which steam is supplied from steam source 20a under control of valve 40.

Smoke-pot 42, shown in Fig. 4, has a door 44 through which sawdust is fed into the pot. Draft opening 45 is equipped with an adjustable cover or door 46 for regulating the air draft through the smoke-pot. This door may be an up-slide panel acting as a draft regulator. Partition 47 within the smoke-pot is employed as a barrier beyond which the sawdust cannot go and also acts in part as a means for establishing a desired passage 48 through which the smoke is routed unimpeded to supply or smoke inlet duct 35. Clean-out door 49 and emergency gas escape 50 give access to the interior of the pot and also provide emergency relief in the event pressure is built up within the smoke-pot when damper 36 is closed. While a hand-stoked smoke-pot is illustrated, it will be understood that a mechanical stoker may be employed if desired.

Apparatus control

Master stat 41 is preferably located on a panel adjacent to or mounted on the smokehouse in full view of the operator. The master stat responds to changes in dry bulb and wet bulb temperatures within the smokehouse as indicated in the return air duct. Dry bulb and wet bulb elements connected to the master stat are preferably positioned in the return air duct 29 but may be located directly within the smokehouse. The master stat is set manually by the operator to maintain desired dry bulb and wet bulb temperatures within the smokehouse. If conditions in the smokehouse are at a variation from the desired dry bulb and wet bulb conditions for which the master stat is set, then the master stat will bring about the desired conditions by regulating new air damper 31, steam valve 23 serving heater elements 18 and steam valve 40 serving steam spray 39. While there are no limitations with respect to manner of control, the master stat is usually arranged to cause an increase or decrease in air pressure for operating the damper motor of new air damper 31 and the diaphragms serving valves 23 and 40. Damper 36 for regulating the density of smoke supplied from smoke-pot 42 may be manually or automatically controlled as desired. Relief damper 33 is under control of static pressure regulator 43 which may be arranged to control damper 52 if bleeder exhaust 51 is employed. As the static pressure regulator tip indicates a pressure in excess of atmospheric, damper 33 (or 52) will be caused to open and relieve an amount of air sufficient to restore atmospheric pressure conditions or produce a slight negative pressure condition in the smokehouse.

Method of operations

While the smokehouse is capable of treating food products of many kinds and varieties, it is particularly adapted to smoke and complete the cure of sausages, bolognas, salamis, regular and tenderized hams and like products. For purposes of illustrating the operation of the apparatus described above, a preferred method of treating frankfort sausage will be set forth in detail. It is of note, that unlike former processes, the smokehouse is equipped to carry out all required operations, subsequent to the preliminary curing and emulsifying steps, necessary for producing a finished product suitable for consumption. The series of operations which takes place in sequence in the smokehouse, without necessity for moving or for any operation other than setting of controls, includes: drying and finishing the curing of the meat stock, binding to the casing, setting of the meat stock, production and fixing of desired color, cooking, and "firming" to assure a plump appearance.

The meat trimmings are first cured at approximately 38° F. The trimmings are then reduced to an emulsion by cutting and grinding. This operation usually embraces the mixing of various beef and pork trimmings with binders and seasonings, and water in the form of ground ice, the resultant emulsion being placed in a stuffer where the mixture is forced into casings by means, for example, of compressed air. The casings are divided up into links which may be placed on sticks, positioned on trees or trucks preparatory to placing in the smokehouse.

Prior to loading, the temperature in the smokehouse is raised to a point above 100° F. so that after loading the temperature therein will not have dropped below 80 degrees. After the sausage is placed within the smokehouse the master stat is set to produce in the smokehouse a temperature of approximately 120 degrees dry bulb with a relative humidity of 35%. Valve 26 is in open position and with the system under automatic control, as it normally is when in operation, valve 25 will be closed but valve 23 open under control of the master stat. By manipulating valves 22, either manually or under automatic control of a stat in the smokehouse or return duct, a sufficient amount of heater surface, as represented by heater elements 18 are made effective to cause the temperature in the smokehouse to be raised to approximately 120° F. in about fifteen minutes for frankfort sausage. To avoid excessive weight loss, steam spray 39 will become effective to add moisture to the smokehouse if the relative humidity should fall below approximately 35%. No smoke is utilized during this first step. At the end of the fifteen minute period the surfaces of the casings are dry and ready for application of smoke.

At the completion of this step the master stat is set to attain a temperature within the smokehouse of about 135 degrees with a relative humidity of 35%. Dense smoke is admitted under control of damper 36. As before, the master stat controls steam valve 23 and steam spray 39. While the steam spray is used to add moisture in the event the relative humidity falls below 35%, the master stat also regulates damper 31 to admit new air which normally causes a reduction of relative humidity in the smokehouse, in those instances where the relative humidity exceeds the desired limit. The temperature is raised from 120 degrees to 135 degrees, gradually, in approximately twenty minutes for frankfort sausage. This rise in temperature plus the application of smoke results in (a) the binding of the casing to the meat mixture so that it sticks by adhesion to the outer surface of the mixture and (b) imparting desired color and flavor.

At the completion of this step the master control is set to produce a temperature in the smokehouse of about 145 degrees with a relative humidity of 35%. Dense smoke is still applied continuously. The rise in temperature from 135 degrees to 145 degrees takes place, gradually, in about fifteen minutes. This further rise in temperature causes the meat mixture to set so that instead of a soft pasty composition a homogeneous set mass is formed. A continued application of smoke continues to fix the color and set the flavor as in the previous step.

Upon the completion of the last step the master stat is now set to produce a temperature in the smokehouse of about 160° F. with a relative humidity in the neighborhood of 35%. The application of smoke during this step is optional but usually is employed. The temperature is raised gradually to 160 degrees in about twenty minutes. This further rise of temperature brings out a desired pink color which is fixed uniformly throughout the sausage. While continued application of smoke may, at times, impart further flavor, the application of smoke in the previous steps may be sufficient for this purpose. The color fixing, however, is substantially completed during this last step.

When the temperature has attained 160° F., no further smoke need usually be applied. The master stat is then set to produce a temperature of 170 degrees dry bulb in the smokehouse at a relative humidity of 100%. Steam in the form of vapor is admitted through sprays 39 (which may be many in number instead of just one as shown for purposes of illustration), and steam may also be admitted for this purpose through sprays 16, if desired. The raising of the temperature in the smokehouse to 170 degrees, saturated, completes the cooking of the sausages. This rise to 170 degrees is accomplished as speedily as possible and the interior of the smokehouse kept in saturated condition at 170 degrees for approximately ten minutes, more or less, or until the internal temperature of the sausages attains about 152° F. The total operation of raising the temperature to 170 degrees, saturated, and maintaining it at this point takes, in all, about fifteen minutes.

When the internal temperature of 152° F. has been attained, the master stat is set to turn off the heat and vapor by closing the valves 23 and 40. The sausages are then showered with cold water through sprays 16. This shower of cold water solidifies the gelatinous material between the casing and meat mixture giving the sausages a firm and plump appearance. This is called "setting up" the sausage.

The smokehouse may then be opened for the first time since the commencement of operations and the sausages conveyed therefrom to storage or packing rooms.

While the cooking step is preferably carried out by maintaining a temperature of 170 degrees with a relative humidity substantially of 100%, it may also be accomplished by showering the sausages with steam and hot water through nozzles 16. Conduits may be employed with ordinary valve arrangements for feeding hot water and steam to sprays 16, as well as cold water.

*Time-temperature relationship*

It will be understood by those skilled in the art that depending upon the type and size of sausage, and the capacity of the smokehouse, the schedule of operations will be varied in different instances. However, the essential features of drying, finishing of treatment prior to smoking, binding, meat setting, color fixing, cooking, and firming are preferably all carried on in a continuous series of steps within the smokehouse, each step accomplished on a rising temperature curve, except for the final water shower and firming step. Thus, for frankfort sausages, as shown in Fig. 5, the time periods and temperature rises will take place substantially as shown but it will be understood that for other products, the curve will differ. Similarly, for other types of products, the method of operation will be varied although in each case the necessary steps will preferably be completed in the smokehouse, without interruption, in a single series of steps.

It will be understood that the master stat may be set by hand or by a time-controlled mechanism which will progressively reset the apparatus for each step at the completion of the time interval required for the preceding step.

Since many changes may be made in the invention without departing from its scope, it is intended that all matter contained in the above description or shown in the accompanying drawings shall be interpreted as illustrative only and not in a limiting sense, applicant limiting himself only as indicated in the appended claims.

I claim:

1. A smokehouse apparatus of the character described, comprising in combination an enclosure, a supply passage connected to the enclosure, an air distributing duct substantially at the ceiling level of the enclosure running lengthwise thereof and connected to the supply passage, discharge outlets at the bottom of said duct for delivering conditioned air from the duct downwardly within the enclosure substantially vertically toward the floor level of the enclosure, return air outlets arranged substantially at the ceiling level of the enclosure for withdrawing air from the enclosure and causing the air supplied to the enclosure to circulate substantially uniformly throughout the enclosure, a return air duct integral with the ceiling and connected to said return air outlets, the supply passage and return air duct connecting with air conditioning equipment for imparting desired characteristics of temperature and humidity to a given supply of air, and means for imparting motion to said air to cause circulation throughout the apparatus.

2. In a smokehouse apparatus of the character described, an enclosure comprising four walls, a ceiling, a floor and doors in one of the walls for admitting trucks within the enclosure and then providing a sealed enclosure during an interval within which products on the trucks are subjected to treatment, a duct in the ceiling running substantially lengthwise of the enclosure, nozzles in the bottom of the duct for discharging air downwardly between trucks, return ducts to one side of the nozzles and positioned at the ceiling for withdrawing air from the enclosure and assuring uniform circulation throughout the area accommodating products on the trucks, said return ducts including outlets equipped with resistance means for regulating movement of air in different areas within the enclosure, steam supply means for subjecting the products to steam charged air and control means for regulating the condition of air within the enclosure at different time intervals whereby a first condition is produced for drying the products and consecutive other conditions are then produced for binding, meat setting, color fixing, cooking and firming the products prior to withdrawal of the products from the smokehouse.

3. A smokehouse apparatus for treating meat products comprising an enclosure, a supply duct at the ceiling level of and integral with the top of the enclosure, a plurality of nozzles at the supply duct for delivering air downwardly to the floor level of the enclosure, a plurality of return ducts at the ceiling level of and integral with the top of the enclosure for withdrawing air from the enclosure, outlets in the bottom of the return ducts and dampers in the outlets, means for adjusting the position of said dampers to vary the area of the outlets, a plurality of heating elements outside the enclosure, a passageway accommodating said elements, means for routing air through said elements to the enclosure and a return passageway for returning air from the enclosure for further treatment by said elements, damper means within the return passageway for regulating the rate of withdrawal of air from said outlets and for varying the air pressure within the enclosure, means for admitting new air to said first passageway, means for admitting smoke to said first passageway, and steam supply means for governing the moisture content of the air in the enclosure.

4. A smokehouse arrangement of the character described including an enclosure having sides, top and a bottom, sealing means for admitting a plurality of trucks within the enclosure and for sealing the enclosure after the trucks are in position therewithin, a supply duct at the ceiling level and integral with the top of the enclosure, discharge openings in said duct for directing conditioned air and smoke downwardly into the enclosure from the ceiling level to the floor and between adjacent trucks, a return air passage at the ceiling level and integral with the top and positioned between said supply duct and a side wall, return openings in the bottom of said passage positioned substantially over an area for accommodating a truck, and means without the enclosure for supplying air at a desired temperature and relative humidity to said supply duct and for withdrawing air from the enclosure through the return passage.

5. In a combination of apparatus for smoking food products, means forming a smokehouse enclosure, means including a supply passage and a plurality of heating elements for delivering to said enclosure air at a desired temperature, means for adding smoke to said air prior to its delivery from the passage to the enclosure, a supply duct at the ceiling of the enclosure for receiving air and smoke from the passage, nozzles in the bottom of said duct, means for discharging said air and smoke within said enclosure from said nozzles in a plurality of streams directed downwardly to the floor level of said enclosure from the ceiling level thereof, means for withdrawing air and smoke from said enclosure at a plurality of points substantially at the same level at the ceiling as the nozzles, and means for varying the condition of air delivered to the enclosure.

6. In a combination of apparatus for smoking food products, means forming a smokehouse enclosure, said enclosure having a ceiling with a plurality of ducts substantially integral therewith, means comprising one of said ducts for supplying air and smoke to the enclosure, means for supplying to said duct air having desired characteristics of temperature and humidity, means for supplying smoke to said duct, a plurality of spaced nozzles in the bottom of said duct through which air and smoke are discharged downwardly into the enclosure toward the floor level thereof, another of said ducts comprising a return air passage, a plurality of openings in the bottom of said other duct for withdrawing air and smoke from said enclosure at a plurality of points proximate the ceiling level thereof, means for regulating the rate of air and smoke withdrawal at different of said points of withdrawal for effecting uniform circulation of air and smoke throughout said enclosure, and a fan for imparting motion to said air and smoke.

ROBERT LESLIE JONES.